Dec. 22, 1931.  L. M. CHRISTIE  1,837,759
CONDUIT
Filed May 9, 1928  2 Sheets-Sheet 1
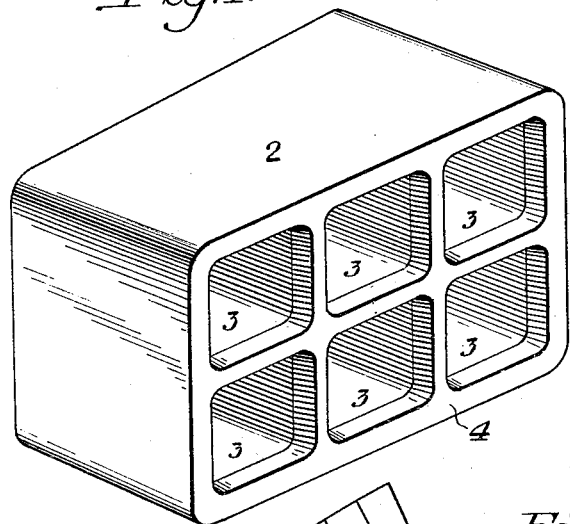
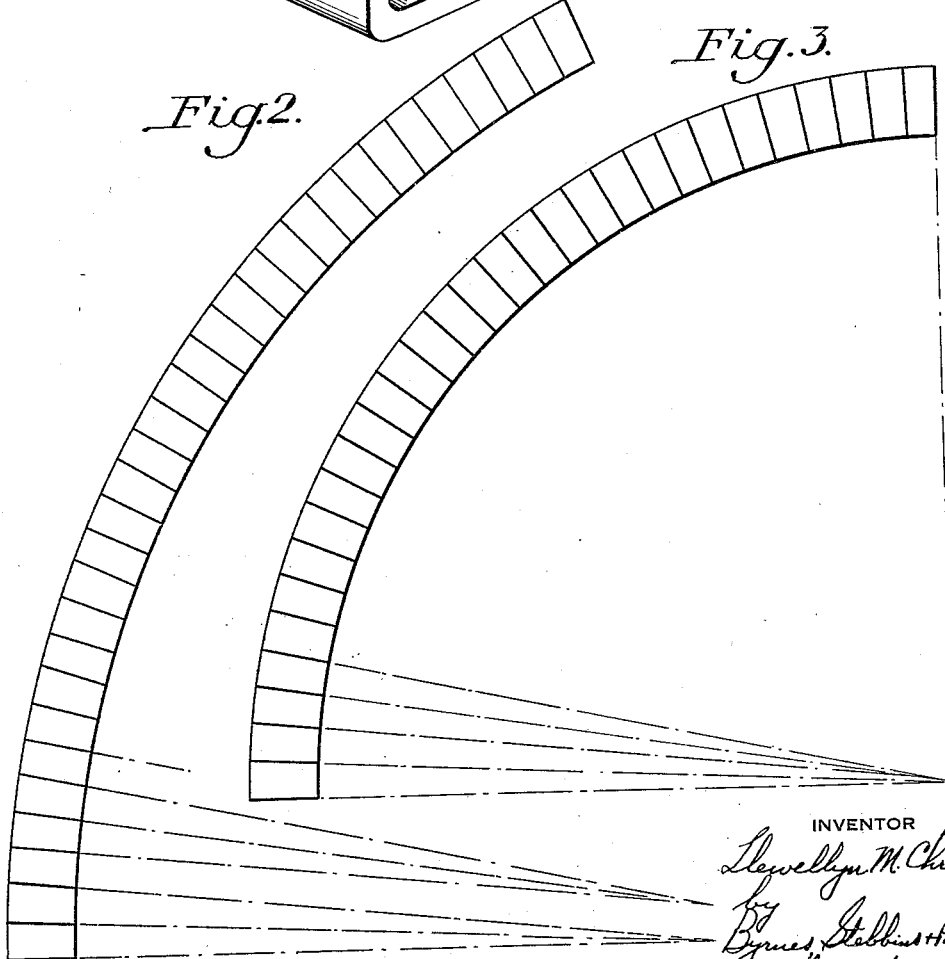
INVENTOR
Llewellyn M. Christie
by Byrnes, Stebbins & Parmelee
his attorneys Dec. 22, 1931.  L. M. CHRISTIE  1,837,759
CONDUIT
Filed May 9, 1928  2 Sheets-Sheet 2

INVENTOR
Llewellyn M. Christie
by Bues, Stebbins & Turnbee
his attorneys

Patented Dec. 22, 1931

1,837,759

UNITED STATES PATENT OFFICE

LLEWELLYN M. CHRISTIE, OF PITTSBURGH, PENNSYLVANIA, ASSIGNOR, BY MESNE ASSIGNMENTS, TO NATIONAL FIREPROOFING CORPORATION, OF PITTSBURGH, PENNSYLVANIA, A CORPORATION OF PENNSYLVANIA

CONDUIT

Application filed May 9, 1928. Serial No. 276,224.

This invention relates broadly to conduit and more particularly to conduit which is especially adapted for containing current carrying conductors. It further relates to conduit made up of sections and adapted to be laid to form a curve of a desired radius. It still further relates to a section of conduit adapted to form a part of a curved length and adapted to be joined together with other sections to form curved lengths of conduit of various radii.

Conduit as heretofore known has been made up of straight sections and elbows or circularly curved sections. These elbows have been of various radii, but each has necessarily been of one particular size and shape and adapted to be used in a curve of one radius only. An elbow as commonly known comprises a curved duct having at its extremities faces which are perpendicular to the axis of the duct at its points of intersection with such faces.

With conduit as above described it has been necessary to provide elbows of special sizes for each curve which it is desired to lay. One elbow, being of a fixed size and curvature is adapted for use only in a curve of a predetermined radius. Thus many different sizes and shapes of elbows have of necessity been carried in stock in order to provide for the laying of curves of various radii.

I provide a conduit section adapted to be laid together with other sections, to form a curve of any designed radius within certain limits. I further provide a conduit system whereby by the use of my novel conduit section in conjunction with straight sections in various ratios curves of desired radii may be formed.

Figure 4:
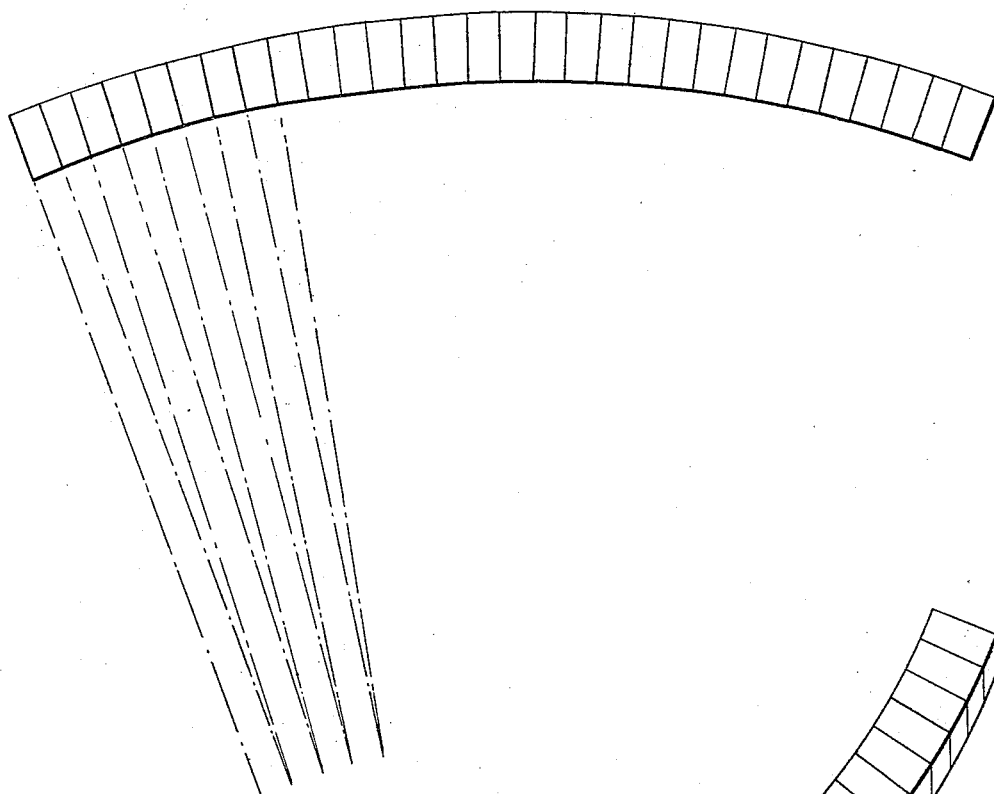
Figure 5:
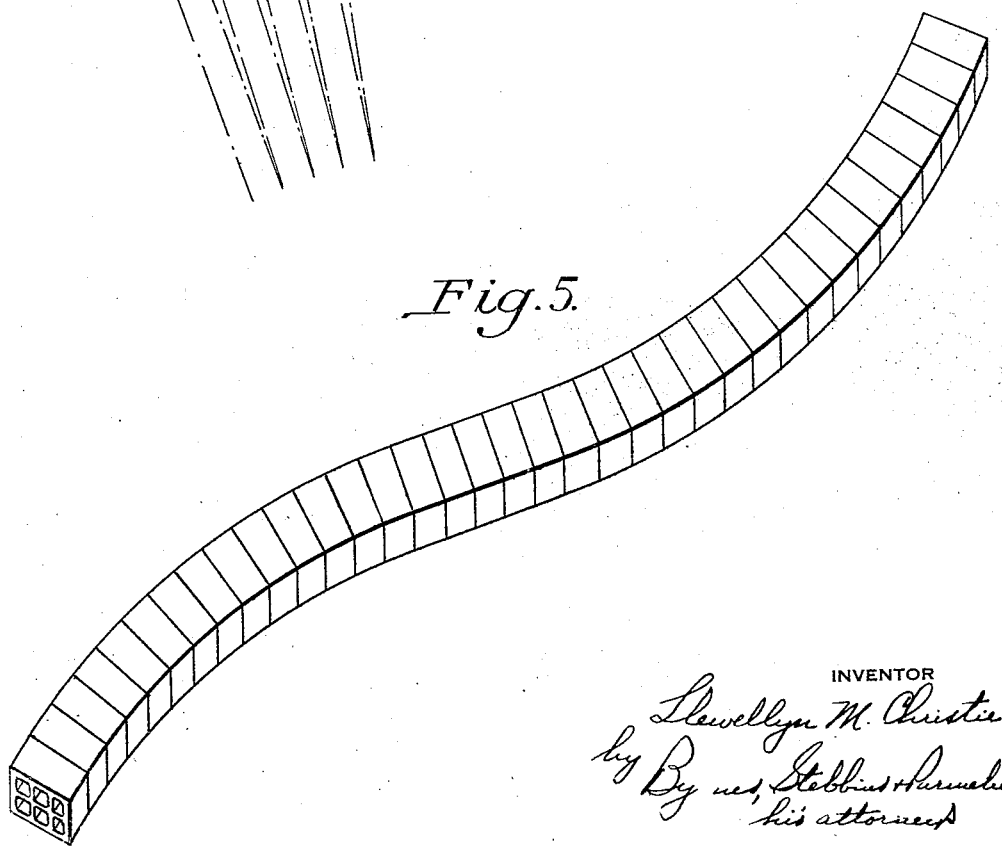

In the accompanying drawings I have shown certain present preferred embodiments of the invention wherein Figure 1 is a perspective view of a conduit section;

Figures 2, 3 and 4 are diagrammatic views showing certain curves which may be formed by my conduit system; and Fig. 5 is a perspective view showing a reverse curve formed by my system.

Referring more particularly to the drawings, reference numeral 2 designates generally a section of conduit or unit formed of ceramic material and having ducts 3 for the reception of current carrying conductors. Reference numeral 4 designates generally one end face of the section. This end face is disposed at an angle to the opposite end face and both of such faces are disposed at an angle to the axes of the respective ducts 3, which axes are straight lines. The plane of each end face makes the same angle with the axes of the respective ducts. Thus a wedge shaped section is formed in which the ducts extend in straight lines between the end faces and are intersected thereby at any angle, such faces converging toward each other in one direction.

While the angle between the end faces may be any angle desired, I have found in actual practice that an angle of 3° is most satisfactory for ordinary purposes. When the two end faces extend at an angle of 3° to one another, each of them intersects the axis of each duct at an angle of 88½°. While the axes of the ducts are preferably made straight, they may also be curved if desired. It is more economical to form them straight as the section may be formed by the usual extrusion process whereby the ceramic material comprising it is forced through a die in a plastic mass.

While the length of the section in the direction of the axes of the ducts may be any length desired, I have found in actual practice that the most desirable smallest longitudinal dimension of the section is 6″. This makes the section small, light in weight and easy to handle and at the same time increases the flexibility of the uses to which it may be put.

The section 2 is preferably used in conjunction with a straight section 6″ long whose end faces are parallel. The parallel faced section is preferably of the same cross-sectional shape as the section 2, as it is desirable to extrude both sections from the same or similar dies. Therefore the area of each end face of the section 2 is very slightly greater than the area of each end face of the parallel faced section, but on account of the small angle of bevel of each end face of the section 2, the difference in area between the end faces of the two sections is negligible for practical purposes, and such faces substantially coincide when placed together. Furthermore, the extremities of the ducts are beveled, as shown in Figure 1, thus eliminating any possible slight undesirable effect which might otherwise be produced by misalignment of the ducts of adjacent sections.

Using both parallel faced sections and non-parellel faced sections, curves of practically any desired radii may be formed without the use of special shapes. Only the two shapes are necessary to form practically any curve.

The non-parallel faced sections may be used alone and placed face to face to form a plain curve of small radius. Using the preferred size as an example a 90° 10′ radius curve may be made using only thirty of the non-parallel faced sections. Such a curve is shown in Figure 3.

In Figure 5 is shown a reverse curve wherein two oppositely curved lengths of conduit are joined by short straight length. Both of the curved lengths are formed of my special sections and the straight length is formed of straight sections of the relative dimensions above given.

The non-paralel faced sections and the parallel faced sections may be combined in various desired proportions to form curves of various desired radii. In Figure 2 is shown a curve in which every third section is a straight section, the two sections intermediate each pair of straight sections being non-parallel faced sections. This forms a 15′ radius curve or a curve of half again the radius of that shown in Figure 3.

In Figure 4 is shown a 20′ radius curve which is made up of alternate non-parallel faced and parallel faced sections. Curves of greater radii may be formed by using more straight sections and less non-parallel faced sections. For instance a 25′ radius curve may be formed using three straight sections to every two non-parallel faced sections, and a 30′ radius curve may be formed by using two straight sections to every one non-parallel faced section. The ratio of parallel faced sections to non-parallel faced sections determines substantially the radius of the curve, the radius being greater for a larger than for a smaller value of such ratio.

The following tables show the number and proportion of parallel faced and non-parallel faced sections of the preferred dimensions above given which are used to form curves of desired radii and of desired degrees of curvature:

TABLE I

*10 foot radius curve*

| Degrees of curvature | Number of non-parallel faced sections required | Number of parallel faced sections required |
|---|---|---|
| 3 | 1 | 0 |
| 6 | 2 | 0 |
| 12 | 4 | 0 |
| 18 | 6 | 0 |
| 24 | 8 | 0 |
| 30 | 10 | 0 |
| 36 | 12 | 0 |
| 48 | 16 | 0 |
| 60 | 20 | 0 |
| 72 | 24 | 0 |
| 90 | 30 | 0 |

TABLE II

*15 foot radius curve*

| Degrees of curvature | Number of non-parallel faced sections required | Number of parallel faced sections required |
|---|---|---|
| 6 | 2 | 1 |
| 12 | 4 | 2 |
| 18 | 6 | 3 |
| 24 | 8 | 4 |
| 30 | 10 | 5 |
| 36 | 12 | 6 |
| 48 | 16 | 8 |
| 60 | 20 | 10 |
| 72 | 24 | 12 |
| 90 | 30 | 15 |

TABLE III

*20 foot radius curve*

| Degrees of curvature | Number of non-parallel faced sections required | Number of parallel faced sections required |
|---|---|---|
| 3 | 1 | 1 |
| 6 | 2 | 2 |
| 12 | 4 | 4 |
| 18 | 6 | 6 |
| 24 | 8 | 8 |
| 30 | 10 | 10 |
| 36 | 12 | 12 |
| 48 | 16 | 16 |
| 60 | 20 | 20 |
| 72 | 24 | 24 |
| 90 | 30 | 30 |

TABLE IV

*25 foot radius curve*

| Degrees of curvature | Number of non-parallel faced sections required | Number of parallel faced sections required |
|---|---|---|
| 6 | 2 | 3 |
| 12 | 4 | 6 |
| 18 | 6 | 9 |
| 24 | 8 | 12 |
| 30 | 10 | 15 |
| 36 | 12 | 18 |
| 48 | 16 | 24 |
| 60 | 20 | 30 |
| 72 | 24 | 36 |
| 90 | 30 | 45 |

Table V

30 foot radius curve

| Degrees of curvature | Number of non-parallel faced sections required | Number of parallel faced sections required |
|---|---|---|
| 3 | 1 | 2 |
| 6 | 2 | 4 |
| 12 | 4 | 8 |
| 18 | 6 | 12 |
| 24 | 8 | 16 |
| 30 | 10 | 20 |
| 36 | 12 | 24 |
| 48 | 16 | 32 |
| 60 | 20 | 40 |
| 72 | 24 | 48 |
| 90 | 30 | 60 |

Thus by the simple provision of my special section with short straight sections smooth curves of practically any desired radius may be laid. The cost of making the sections, of keeping them in stock and of handling and laying them is very much less than with the old type elbows, each of which could be used only in a curve of one specific radius. The elbows are more unwieldy than my special section and do not even remotely approach the flexibility and usefulness thereof.

While I have shown and described certain present preferred embodiments of my invention, it is to be understood that the same is not limited thereto but may be otherwise embodied within the scope of the following claim:

I claim:

A set of related hollow conduit units adapted when laid together to form a conduit having a duct extending therethrough, such set being made up of two classes of units only, the first class comprising units whose end faces are substantially parallel, and the second class comprising units whose end faces are disposed at a predetermined angle to each other, such units being adapted to be disposed in interspersed relation to form a generally curved conduit portion the approximate radius of curvature of which may be varied by varying the ratio of the number of units of the first class to the number of units of the second class employed, whereby the need of special shapes for curves of particular approximate radii of curvature is obviated.

In testimony whereof I have hereunto set my hand.

LLEWELLYN M. CHRISTIE.

CERTIFICATE OF CORRECTION.

Patent No. 1,837,759.                         Granted December 22, 1931, to

LLEWELLYN M. CHRISTIE.

It is hereby certified that error appears in the printed specification of the above numbered patent requiring correction as follows: Page 1, line 34, for the word "designed" read desired, and line 92, after "section" insert the words or unit; page 2, line 31, before "short" insert the article a; and that the said Letters Patent should be read with these corrections therein that the same may conform to the record of the case in the Patent Office.

Signed and sealed this 16th day of February, A. D. 1932.

(Seal)                                                             M. J. Moore,
Acting Commissioner of Patents.